United States Patent

[11] 3,594,087

| [72] | Inventor | Victor Eduardo Vasquez Miranda<br>Huntington Beach, Calif. |
|---|---|---|
| [21] | Appl. No. | 874,556 |
| [22] | Filed | Nov. 6, 1969 |
| [45] | Patented | July 20, 1971 |
| [73] | Assignee | Baxter Laboratories, Inc.<br>Morton Grove, Ill. |

[54] OPTICAL DENSITOMETER WITH RETROREFLECTIVE MEANS
4 Claims, 4 Drawing Figs.

| [52] | U.S. Cl. | 356/203, 250/219 (FR) |
|---|---|---|
| [51] | Int. Cl. | G01n 21/30 |
| [50] | Field of Search | 250/219; 350/104, 105, 106; 356/201, 202, 203, 239 |

[56] References Cited
UNITED STATES PATENTS

| 3,013,467 | 12/1961 | Minsky | 356/201 |
| 3,214,596 | 10/1965 | Schwendt et al. | 250/239 |
| 3,401,592 | 9/1968 | Atman | 350/105 |
| 3,493,769 | 2/1970 | Revesz | 356/201 |

*Primary Examiner*—Ronald L. Wilbert
*Assistant Examiner*—Orville B. Chew, II
*Attorneys*—Robert G. Pollock and Walter C. Kehm

ABSTRACT: An improved optical densitometer is provided for measuring the varying optical densities of a photographic film, or equivalent media, along the length of the media, and which includes retroreflective means for compensating for irregularities in the surface of the media which would otherwise affect the precision of the optical density readings.

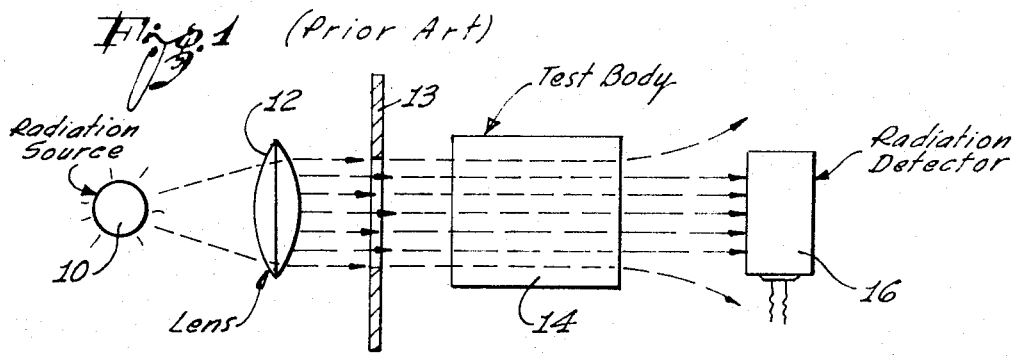
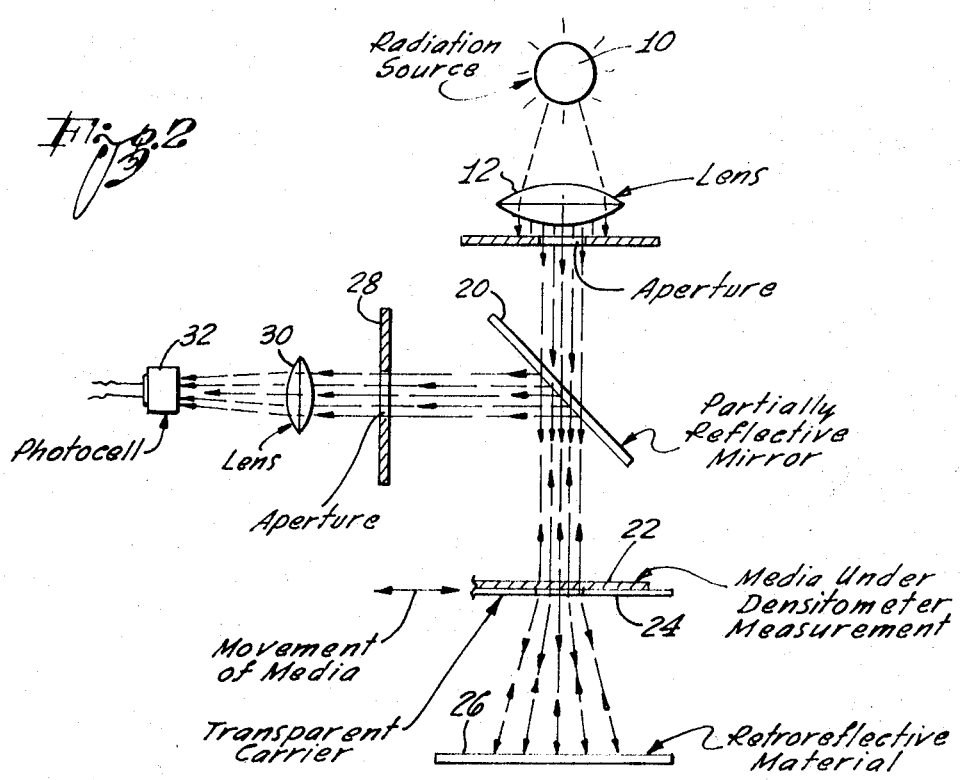

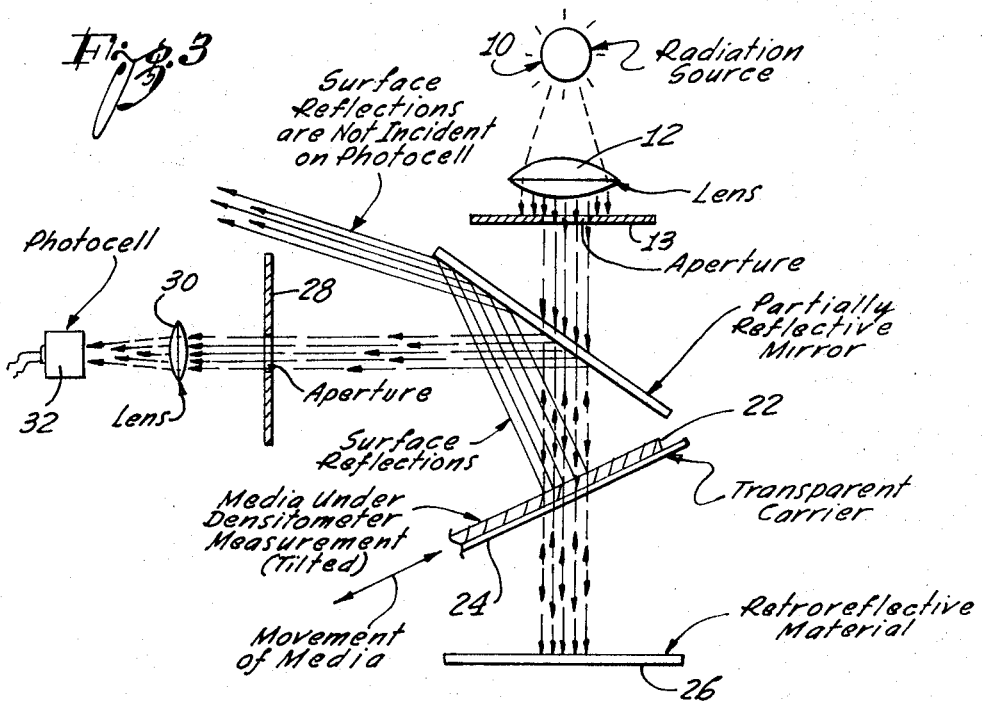
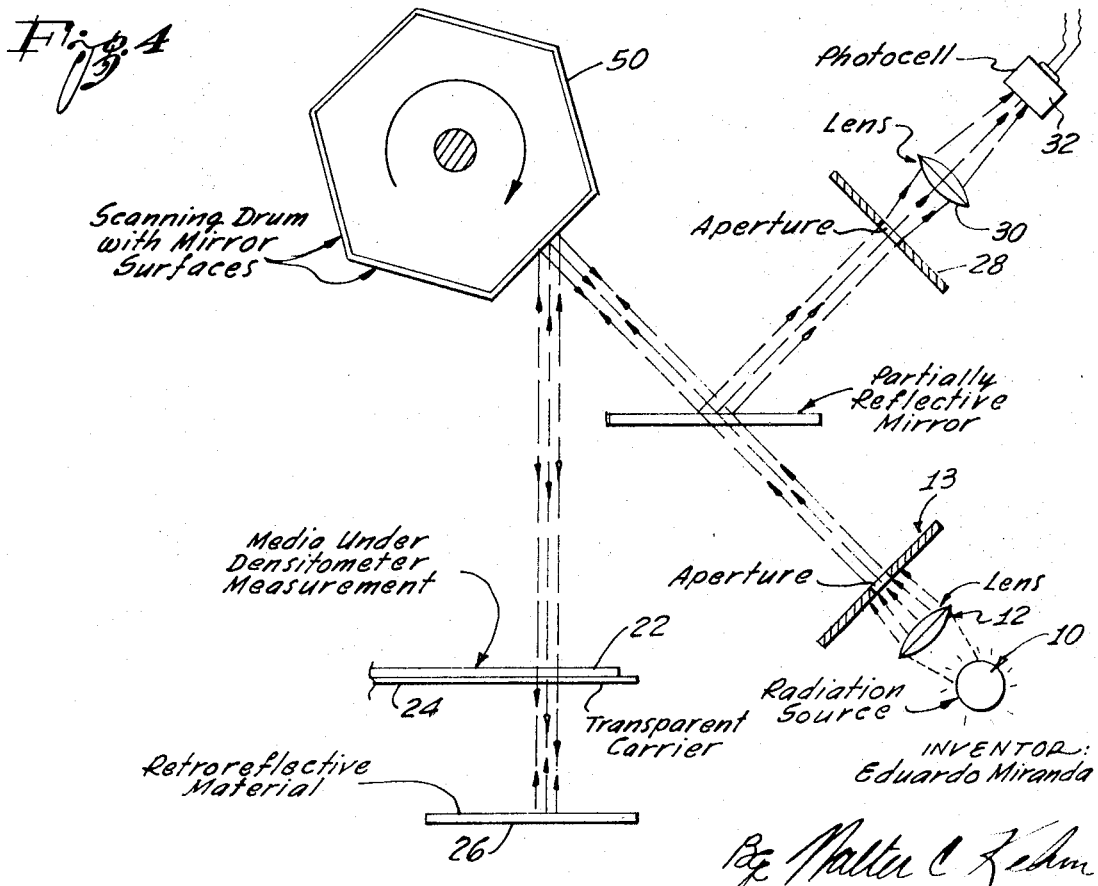

OPTICAL DENSITOMETER WITH RETROREFLECTIVE MEANS

BACKGROUND OF THE INVENTION

The intensity of a radiant beam, or the spectral distribution of the intensity may be measured photographically. This is achieved by comparing the intensity of the radiant beam with a beam from a standard source, and by measuring the photographic densities produced by both. The comparisons are made by exposing adjacent areas of a photographic film to the unknown and standard radiations, then the photographic densities may be measured by a densitometer. In a usual densitometer, for example, the exposed film is supported on a transparent carrier such as glass. Then, a light source is placed on one side of the film and tape and a photocell on the other, so that the light from the source is directed through the film and through the carrier to the photocell. The carrier is then moved, so that optical density readings may be made along the length of the film for comparison purposes.

The densitometer is also used for electrophoresis measurements. For such purposes an agar film is spread over a transparent carrier in the form, for example, of a strip of Mylar or acetate, and a drop of plasma, or other protein-bearing fluid, is placed on the agar film. An electric current is passed through the film and the fractions of the protein are thereby caused to separate into bands. The densitometer may then be used to measure the optical density of each band after suitable staining.

A problem in the prior art technique as described in the preceding paragraph is that irregularities in the surface of the media and of the transparent carrier refract the light rays, so that varying amounts of light reach the photocell as the carrier and media move, due to such irregularities, and such varying amounts of light seriously affect the precise measurement of the optical density changes of the media.

In practicing the concepts of the present invention, and as mentioned above, all the light rays passing through the media and its transparent carrier are returned back through the carrier and through the media by retroreflective means. In this way spurious refraction effects by the film and carrier are cancelled out. The, the reflected light rays emerging from the front face of the film are directed to the photocell detector, so that all the light which was originally passed by the media and its carrier is incident upon the photocell detector. By this technique, there is no need for expensive equipment in which optical flaws are minimized. Instead, relatively inexpensive components may be utilized, in such a way that there is no detraction from measurement precision by the system as a whole.

In the application of a retroreflective metering or measuring system and apparatus of the type under consideration, one of the additional benefits is that the light transverses the thickness of the media both prior to reflection from the retroreflective means, and after reflection. This provides a greater net optical density measuring path for increased precision, since the media whose optical density is to be measured is effectively twice as thick as the actual thickness of the media.

The term "retrorefelctive" or "reflex reflective" as used herein is intended to designate a reflective surface which is capable of reflecting an incident beam, or ray of light, in such a manner that the beam or ray is redirected back towards its source even though the incident light strikes the reflecting surface at an angle. The terms are intended to distinguish the type of reflection achieved by retroreflective reflectors from the specular reflection of a usual mirror, and from the light dissipation effect of a light-diffusing surface. Retroreflective reflectors are known and have been used as highway marking and advertising signs. They are well suited for that purpose since they act to reflect the headlights of passing vehicles directly back to the vehicles with a high degree of brilliance.

Retroreflective members are usually made up of a multiplicity of glass beads which are adhesively secured to a reflective substrate or layer of reflective material. The individual beads then serve as spherical lenses, so that any beam or ray of light which is directed from any angle onto the retroreflective member is refracted to the reflective layer by the individual beads and then reflected and again refracted directly back towards its origin.

Briefly stated, therefore, a reflex or retroreflective member is one which acts on an incident beam or ray of light to refract or reflect it in such a manner that most of the light is returned back towards its source essentially along the same path. The retroreflective or reflex member which is appropriate for reflecting light rays directly back along their paths of incidence, regardless of the angle of incidence, may be of the type which is presently being marketed, for example, by the 3M Company, under its trademark "Scotchlite," and identified by the company as its "Scotchlite Reflective Sheeting 07610."

BRIEF DESCRIPTION OF THE DRAWINGS

FIG. 1 is a schematic representation of a typical prior art measuring system in which a beam of radiation from a particular source is passed through a test body to a radiation detector, so that the absorption characteristics of the test body on the radiant beam may be measured;

FIG. 2 illustrates the concepts of the present invention as applied to a densitometer for reading electrophoresis patterns or other media supported on a movable transparent carrier;

FIG. 3 is a modification of the apparatus of FIG. 1, in which the media and its carrier are tilted, so that spurious surface reflections from the media may be directed away from the photocell detector; and FIG. 4 shows another embodiment of a densitometer incorporating the concepts of the invention and providing a scanning action for optical density readings of the media along its length.

DETAILED DESCRIPTION OF THE ILLUSTRATED EMBODIMENTS

As shown in FIG. 1, for example, a radiation source which, in the case of the densitometer of the present invention, is a light source, is designated 10. Light from the source 10 may be formed into a beam by an appropriate lens 12, and the beam may be given any desired cross-sectional area by means of an appropriate aperture member 13. The resulting beam is passed through the test body, designated 14, and is then directed to an appropriate photoelectric transducer 16, in this case, for example, a photocell.

The radiation detector 16 converts the radiations incident on it from the source 10 into electrical signals, and the electrical signals are used to designate the absorption characteristics of the test body on the radiation. In the case of densitometry, the test body takes the form of an exposed photographic film or an electrophoresis pattern which is supported on an appropriate transparent carrier, and the carrier is moved across the light beam from the aperture 13 so that readings may be taken showing variations in the optical densities of the film along its length.

Imperfections in the optical characteristics of the media cause refractions of the light beams, so that some of the light rays are directed away from the radiation detector 16, as shown in FIG. 1, causing measurement errors.

In the embodiment of the invention shown in FIG. 2, the light beam from the source 10, after passing through the aperture 13 is passed through a partially reflective mirror 20 and through the media 22 and its carrier 24 to a retroreflective member 26. As mentioned above, the media 22 is in the form of an exposed photographic film, or electrophoresis pattern which is supported on a transparent carrier 24. It will be observed that any refraction of the light rays passing through the media 22 and carrier 24, and which causes the light rays to be incident on the member 26 in a nonperpendicular manner, does not affect the reflective characteristics of the member 26, since all light rays are directed back along their lines of incidence and are redirected through the carrier 24 and media 22 to undergo the same refractions, so that they are directed exactly back along the original lines of incidence to the reflective member 20. The reflected rays are reflected by the mirror 20 through a further aperture 28, and through a condensing lens 30 to be gathered and directed onto a photocell 32.

The partially reflective mirror or member 20 may be of any known type which, for example, is capable of passing light through it in one direction, as from top to bottom in FIG. 2, but of reflecting radiations directed to it from the other direction, such as upwardly in FIG. 2. It will be appreciated that although the light passing through the film 22 and its carrier 24 may be deflected due to flaws or other optical imperfections in the media, the retroreflective member 26 serves to redirect each ray of light back along its original path, so that it emerges from the top side of the media 22 in the original beam, as shown in FIG. 2.

By the simple expedient described in the preceding paragraph, all the light passing through the film 22 reaches the photocell 32. Also, and as mentioned above, increased sensitivity is achieved over the usual prior art systems, due to the fact that the beam of light passes twice through the film 22 prior to its detection by the photocell 32.

The embodiment of FIG. 3 is similar to that of FIG. 2, except that the carrier 24 and the supported film 22 are tilted relative to the incident light beam, so that surface reflections from the film 22, which have no relationship to the desired optical density measurements, may be reflected away from the photocell 32, so that such reflections will not produce errors in the readings of the photocell.

In both the embodiments of FIGS. 2 and 3, it will be appreciated that as the transparent carrier 24 is moved, the media 22 is drawn across the light beam to enable optical density readings to made along the length of the media.

In the embodiment of FIG. 4, the media 22 and its carrier 24 may remain stationary in a fixed position over the retroreflective member 26. Then, the light reflected from the partially reflective member 20, instead of being directed directly through the media 22 and its carrier 24, as in the previous embodiments, is directed to a scanning drum 50. The scanning drum 50 may have a hexagonal configuration, with mirror surfaces, and it may be rotated in a manner such that the light beam reflected by it is caused to scan along the length of the media 22. A scanning densitometer is therefore provided so that there is no need to provide movement of the carrier 24, as in the previous embodiments.

As an added advantage, the use of the retroreflective member eliminates the need for photocells having large photosensitive surfaces, or complicated mechanical linkages between the photocell and the scanning mirror. In the prior art arrangements, the area of the sensitive surface of the photocell must either correspond to the area of the film scanned, and yet exhibit uniform response characteristics over the entire sensitive surface; or the photocell must move with the scanning mirror and yet maintain a constant distance from the mirror which requires complex and low tolerance mechanical linkages.

Specifically, as the scanning drum 50 rotates in a clockwise direction, for example, the light rays will scan the surface of the media 22, and pass through the film and its carrier 24 to be reflected by the retroreflective member 26 and back through the film to the scanning drum. The rays will then reflect from the scanning drum back to the partially reflective mirror 20, and then to the aperture 28 and lens 30 of the photocell 32.

By the apparatus of FIG. 4, the photocell 32 receives a light signal dependent upon the optical densities of the portions of the media 22 which are scanned. The scanning drum is only one of the many mirror systems which are suitable for use. A single oscillating mirror, for example, would be appropriate in the apparatus. The scanning may also be achieved by means of refractive elements, which are also well known. As in the previous embodiment, the media may be tilted, to prevent surface reflections from interfering with the precision of the optical density measurements.

What I claim is:

1. Optical densitometer apparatus including: a transparent carrier for supporting media to undergo densitometer measurements; a light source positioned to direct light through said media and through said carrier; means positioned in the optical path between said light source and said media for forming light from said source into a beam directed through said media and carrier; means positioned on the opposite side of said carrier for redirecting the light passing therethrough back through said carrier and through said media, said redirecting means being composed of a retroreflective material capable of reflecting rays of said light beam incident thereon directly back along the paths of incidence thereof; a photoelectric transducer; and a partially reflective member positioned in said optical path between said light source and said media for passing the light beam from said light source to said media and for reflecting the light beam redirected through said media from said retroreflective redirecting means onto said photoelectric transducer.

2. The apparatus defined in claim 1, and which includes means for providing relative movement between said beam and said media.

3. The apparatus defined in claim 1, in which said carrier and said media are tilted with respect to said beam so that surface reflections from said media are directed away from the optical path to said photoelectric transducer.

4. The test apparatus defined in claim 1, and which includes a scanning element positioned in the optical path between said source and said media, for scanning the beam incident on said media across the surface thereof.